United States Patent
Jung et al.

(10) Patent No.: US 9,465,474 B2
(45) Date of Patent: Oct. 11, 2016

(54) APPARATUS AND METHOD FOR DETERMINING INPUT IN COMPUTING EQUIPMENT WITH TOUCH SCREEN

(75) Inventors: Ra-Mi Jung, Suwon-si (KR); Jin-Woo Jung, Suwon-si (KR); Chul-Hwan Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1179 days.

(21) Appl. No.: 12/571,708

(22) Filed: Oct. 1, 2009

(65) Prior Publication Data
US 2010/0097335 A1  Apr. 22, 2010

(30) Foreign Application Priority Data

Oct. 20, 2008  (KR) .................. 10-2008-0102472

(51) Int. Cl.
*G06F 3/041* (2006.01)
*G06F 3/0488* (2013.01)

(52) U.S. Cl.
CPC ........... *G06F 3/0414* (2013.01); *G06F 3/0416* (2013.01); *G06F 3/04886* (2013.01)

(58) Field of Classification Search
CPC . G06F 3/0414; G06F 3/04886; G06F 3/0416
USPC ........ 345/173, 326, 339, 340, 342; 395/893; 178/18.02–18.09, 19, 20
See application file for complete search history.

(56) References Cited

U.S. PATENT DOCUMENTS

| | | | |
|---|---|---|---|
| 6,002,389 A | 12/1999 | Kasser | |
| 6,029,214 A * | 2/2000 | Dorfman et al. | 710/73 |
| 8,089,470 B1 * | 1/2012 | Schediwy et al. | 345/173 |
| 2002/0057259 A1 | 5/2002 | Suzuki | |
| 2002/0113779 A1 * | 8/2002 | Itoh et al. | 345/173 |
| 2004/0212601 A1 | 10/2004 | Cake et al. | |
| 2005/0225540 A1 | 10/2005 | Kawakami et al. | |
| 2008/0284756 A1 * | 11/2008 | Hsu et al. | 345/178 |
| 2008/0305836 A1 * | 12/2008 | Kim et al. | 455/564 |
| 2009/0006958 A1 * | 1/2009 | Pohjola et al. | 715/710 |
| 2010/0073305 A1 * | 3/2010 | Zawacki et al. | 345/173 |

FOREIGN PATENT DOCUMENTS

| | | |
|---|---|---|
| CN | 1187673 C | 2/2005 |
| CN | 1811684 A | 8/2006 |
| CN | 100368970 C | 2/2008 |
| DE | 202008005343 U1 | 9/2008 |
| EP | 1 993 023 A1 | 11/2008 |
| JP | 3143445 U | 7/2008 |

* cited by examiner

Primary Examiner — Shaheda Abdin
(74) Attorney, Agent, or Firm — Jefferson IP Law, LLP

(57) ABSTRACT

An apparatus and method for determining a key input in computing equipment having a touch screen are provided. The method for determining the key input in the computing equipment includes, upon occurrence of a touch input on the touch screen, determining an input type of the touch input, expanding a key input recognition region of at least one key when the input type is a finger touch input, and detecting the key input according to the expanded key input recognition region.

15 Claims, 3 Drawing Sheets

APPARATUS AND METHOD FOR DETERMINING INPUT IN COMPUTING EQUIPMENT WITH TOUCH SCREEN

PRIORITY

The present application claims the benefit under 35 U.S.C. §119(a) of a Korean patent application filed in the Korean Intellectual Property Office on Oct. 20, 2008 and assigned Serial No. 10-2008-0102472, the entire disclosure of which is hereby incorporated by reference.

BACKGROUND OF THE INVENTION

1. Field of the Invention

The present invention relates to computing equipment with a touch screen. More particularly, the present invention relates to an apparatus and method for determining an input in computing equipment with a touch screen.

2. Description of the Related Art

A touch screen is used for processing an input on a screen without an additional input device. When an alphanumeric character or a specific position on the screen is touched by a user's finger or an object, a corresponding position is recognized and then input position information is provided for software processing. The touch screen is constructed by attaching a touch panel on a conventional screen. An invisible infrared ray constituting a large number of square lattices flows on the surface of the touch panel so that the touch panel can recognize a contact point when the lattices are touched by a finger tip or a specific object.

Due to convenience in use and an intuitive interface of the touch screen, the touch screen is used for an announcing device in a place such as a subway, a department store, a bank, etc. In addition, the touch screen is also widely used in computing equipment such as a computer, a mobile phone, etc. When using the computing equipment, a user uses a finger or a stylus pen to provide an input to the touch screen. In this case, a display screen of the computing equipment has a limited size to provide portability, and thus a screen configuration has to be changed according to a type of an input tool. That is, when using the stylus pen, input items can be densely arranged on a screen. In contrast, when using the finger, an input position is indicated with less accuracy than the stylus pen, and thus the input items have to be arranged using a relatively larger and wider space on the screen.

As described above, in the computing equipment with the touch screen, a screen is properly configured according to an input tool. However, the use of the stylus pen is inconvenient since the user has to carry the stylus pen, and the use of the finger is also inconvenient since information that can be displayed on one screen is limited in size. Accordingly, there is a need to address the problems of using the aforementioned input tools.

SUMMARY OF THE INVENTION

An aspect of the present invention is to address at least the above-mentioned problems and/or disadvantages and to provide at least the advantages described below. Accordingly, an aspect of the present invention is to provide an apparatus and method for processing a finger touch input occurring on a screen consisting of densely arranged input items in computing equipment with a touch screen.

Another aspect of the present invention is to provide an apparatus and method for increasing a recognition rate of a finger touch input in computing equipment with a touch screen.

Another aspect of the present invention is to provide an apparatus and method for determining a finger touch input and a stylus touch input in computing equipment with a touch screen.

Another aspect of the present invention is to provide an apparatus and method for regulating a key input recognition region according to an input type of a touch input in computing equipment with a touch screen.

Another aspect of the present invention is to provide an apparatus and method for expanding a key input recognition region when a finger touch input occurs in computing equipment with a touch screen.

In accordance with an aspect of the present invention, a method for determining a key input in computing equipment having a touch screen is provided. The method includes, upon occurrence of a touch input on the touch screen, determining an input type of the touch input, expanding a key input recognition region of at least one key when the input type is a finger touch input, and detecting the key input according to the expanded key input recognition region.

In accordance with another aspect of the present invention, an apparatus for determining a key input in computing equipment having a touch screen is provided. The apparatus includes a determination unit for determining an input type of a touch input upon occurrence of the touch input on the touch screen, and a controller for expanding a key input recognition region of at least one key when the input type is a finger touch input, and for detecting a key input according to the expanded key input recognition region.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, it should be noted that like reference numbers are used to depict the same or similar elements, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following descriptions and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

Hereinafter, a technique for increasing a recognition rate of a finger touch input in computing equipment with a touch screen will be described. In the following description, the computing equipment includes a cellular phone, a Personal Communication System (PCS), a Personal Digital Assistant (PDA), an International Mobile Telecommunication-2000 (IMT-2000) terminal, a laptop computer, a desktop computer, etc.

When a user uses a finger to provide a touch input to a screen on which input items are densely arranged, a biggest problem is that an actual input occurs at a position different from a position intended by the user. Therefore, to determine a correct input point intended by the user when a touch input is provided by using the finger, the computing equipment with the touch screen uses a different key input recognition region according to whether an input is a finger touch input or a stylus touch input. That is, when using the finger touch input, the computing equipment expands the key input recognition region so that any input occurring within a specific range is considered as an input of a corresponding key to perform an operation corresponding to the input key.

Figure 1A:
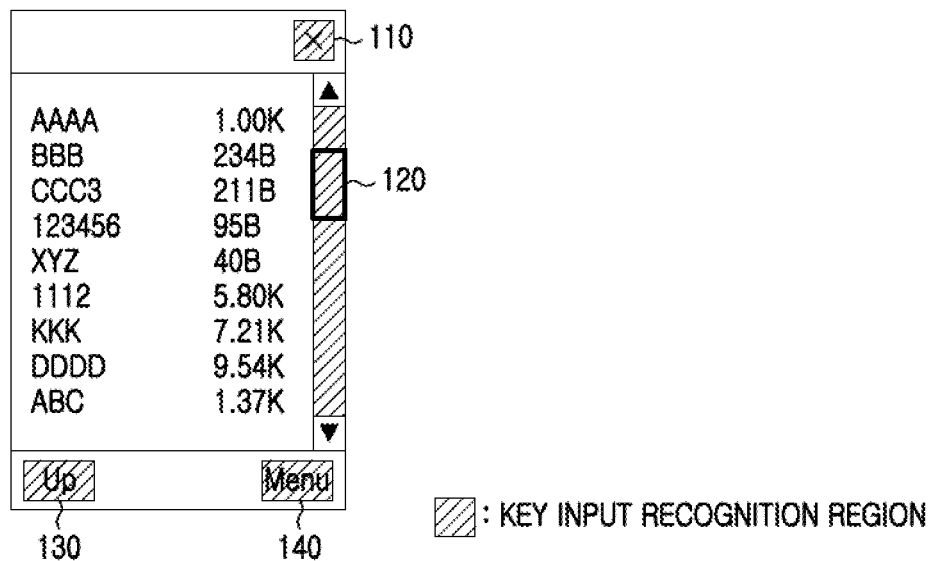
FIG. 1A and FIG. 1B illustrate a key input recognition region depending on an input tool in computing equipment with a touch screen according to an exemplary embodiment of the present invention.
Figure 1B:
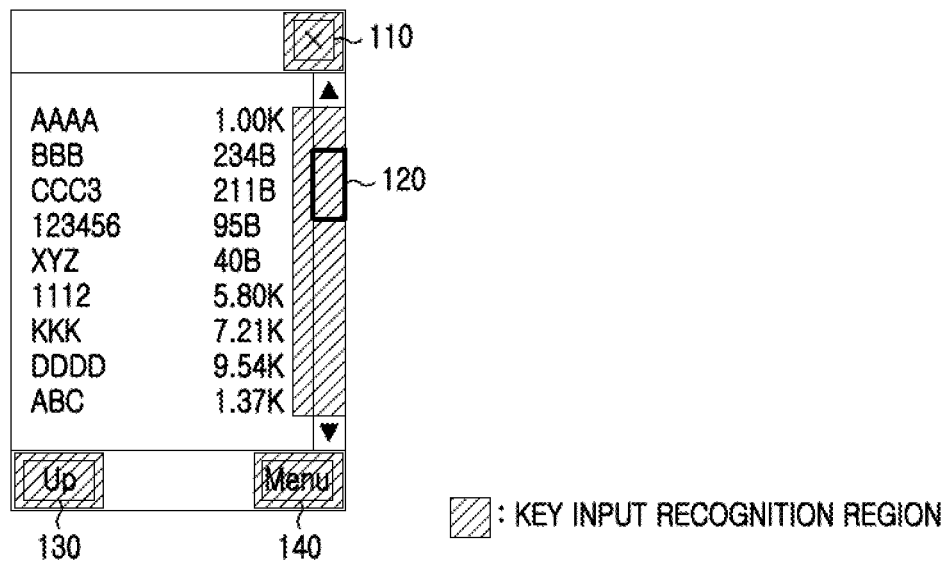

For example, a key input recognition region may differ according to an input tool as illustrated in FIG. 1A and FIG. 1B. In FIG. 1A and FIG. 1B, recognition regions of a window close key 110, a scroll bar 120, a first soft key 130, and a second soft key 140 are expanded. In addition to the keys illustrated in FIG. 1A and FIG. 1B, recognition regions of other keys may be modified according to the implementation.

FIG. 1A illustrates a key input recognition region of each key when using a stylus touch input according to an exemplary embodiment of the present invention. FIG. 1B illustrates a key input recognition region of each key when using a finger touch input according to an exemplary embodiment of the present invention.

Referring to FIG. 1A and FIG. 1B, when using the stylus touch input, the key input recognition region is configured to fit a key boundary displayed on a screen. On the other hand, when using the finger touch input, the key input recognition region is configured to be wider than the key boundary displayed on the screen. Therefore, when using the finger touch input, even if a key input is deviated from the key boundary displayed on the screen, the key input is accepted as long as the extent of deviation is less than or equal to a threshold.

For this, the computing equipment of an exemplary embodiment of the present invention has to determine the stylus touch input and the finger touch input. In general, even pressure distribution is achieved when using the stylus touch input, and uneven pressure distribution is achieved when using the finger touch input. Therefore, the computing equipment determines the stylus touch input and the finger touch input according to whether pressure distribution is even or uneven. That is, the computing equipment uses touch pressure to determine whether an input is a stylus touch input or a finger touch input. If the determination result determines the finger touch input, the computing equipment expands the key input recognition region as illustrated in FIG. 1B, and then determines whether the input is accepted as the key input.

Hereinafter, a structure and operation of computing equipment with a touch screen for determining a key input as described above will be described in detail with reference to the accompanying drawings.

Figure 2:
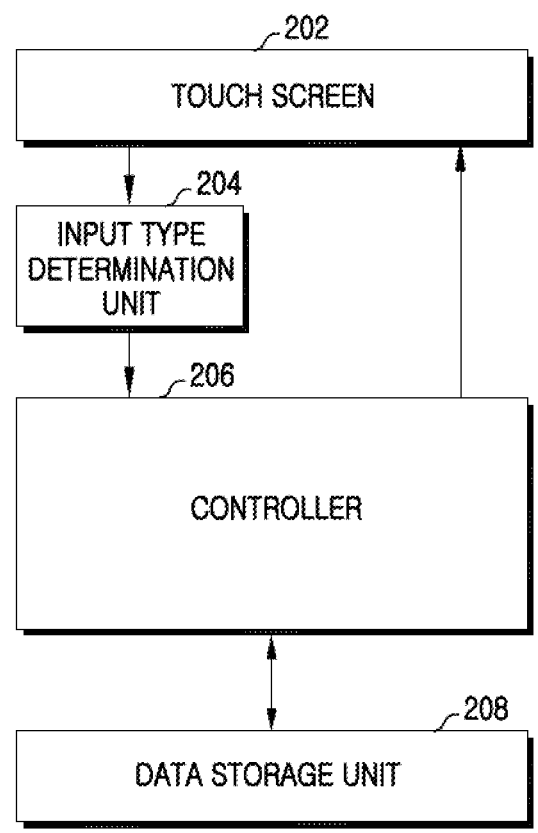
FIG. 2 is a block diagram illustrating a structure of computing equipment with a touch screen according to an exemplary embodiment of the present invention.

FIG. 2 is a block diagram illustrating a structure of computing equipment with a touch screen according to an exemplary embodiment of the present invention.

Referring to FIG. 2, the computing equipment includes a touch screen 202, an input type determination unit 204, a controller 206, and a data storage unit 208.

The touch screen 202 provides a display function for displaying visual information and an input function for recognizing that a touch input occurs by a physical contact. That is, the touch screen 202 displays a state of the computing equipment, alphanumeric characters, images, videos, etc, in a visible format under the control of the controller 206. Further, the touch screen 202 provides the input type determination unit 204 with an occurrence position, a pressure magnitude, and a pressure range of a touch input provided by a user. For example, for the display function, the touch screen 202 includes one of a Cathode-Ray Tube (CRT), a Liquid Crystal Display (LCD), and an Organic Light-Emitting Diode (OLED). In addition, for the input function, the touch screen 202 includes a touch panel (not shown).

The input type determination unit 204 determines an input type of a touch input occurred by the touch screen 202. That is, the input type determination unit 204 determines whether the touch input is a stylus touch input or a finger touch input. In this case, the input type determination unit 204 determines the input type by using at least one of the pressure magnitude and the pressure range of the touch input provided from the touch screen 202. Further, the input type determination unit 204 provides the controller 206 with the determined input type and input position information.

The input type is determined as follows. For example, the input type determination unit 204 determines the input type according to an input type criterion depending on a preset pressure magnitude. That is, the input type determination unit 204 stores an upper threshold and a lower threshold of a pressure magnitude of the stylus touch input. Therefore, if the touch input has a pressure magnitude between the upper threshold and the lower threshold, the input type determination unit 204 determines that the touch input is the stylus touch input. In contrast, if the touch input has a pressure magnitude greater than the upper threshold or less than the lower threshold, the input type determination unit 204 determines that the touch input is the finger touch input.

The controller 206 controls overall functions to operate the computing equipment. More particularly, the controller 206 detects a key input according to input position information and an input type of the touch input provided from the input type determination unit 204. If the input type is the finger touch input, the controller 206 expands key input recognition regions of keys of which recognition regions need to be expanded, and then detects a key input. That is, in a case of the finger touch input, the controller 206 determines that a corresponding key is pressed when the input position is included in the expanded key input recognition region. In other words, the controller 206 detects a key input according to the expanded key input recognition region.

The data storage unit 208 stores an operating system required to operate the computing equipment, an application program for a service, a data generated during execution of the program, user contents, etc. Further, the data storage unit 208 provides a program code at the request of the controller 206, and stores data provided from the controller 206. That is, the data storage unit 208 provides a program code for performing an operation corresponding to a key input determined by the controller 206.

Figure 3:
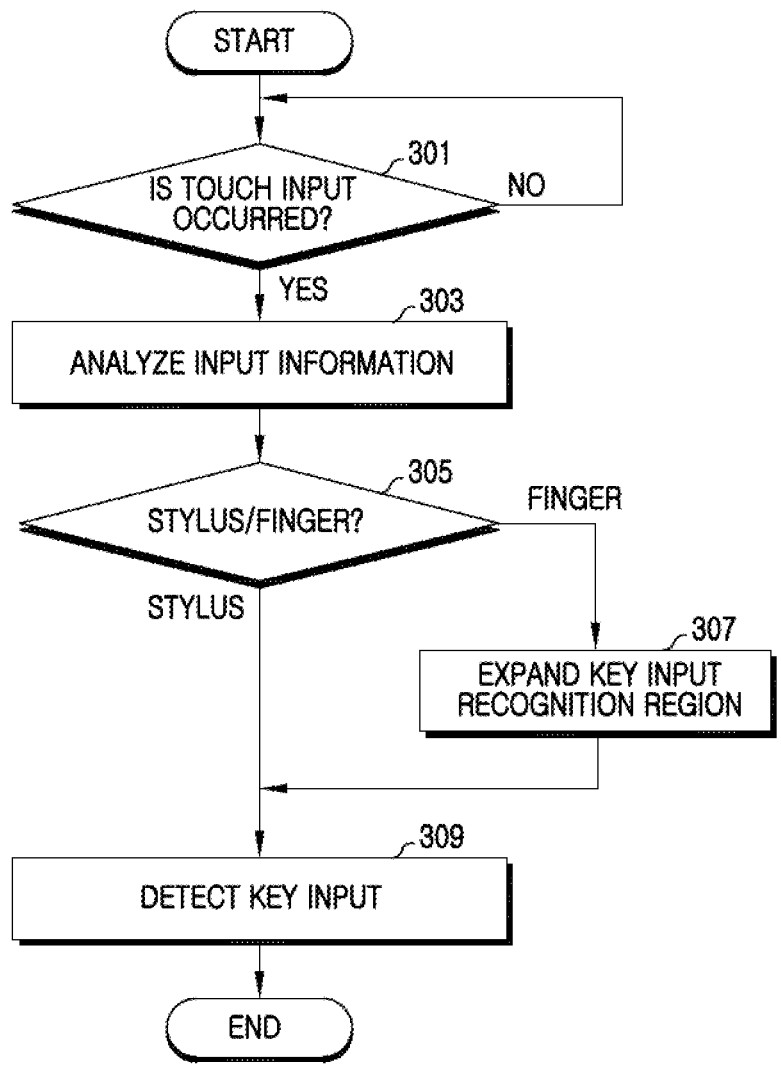
FIG. 3 is a flowchart illustrating a process of determining a key input of computing equipment with a touch screen according to an exemplary embodiment of the present invention.

FIG. 3 is a flowchart illustrating a process of determining a key input of computing equipment with a touch screen according to an exemplary embodiment of the present invention.

Referring to FIG. 3, the computing equipment determines whether a touch input occurs on a touch screen in step 301.

Upon determining the occurrence of the touch input, in step 303, the computing equipment analyzes input information. In other words, the computing equipment determines a position, a pressure magnitude, and a pressure range of the touch input.

After analyzing the input information, in step 305, the computing equipment determines whether an input type is a stylus input or a finger input. In this case, the computing equipment determines the input type by using at least one of the pressure magnitude and the pressure range of the touch input. For example, the computing equipment determines the input type according to an input type criterion depending on a preset pressure magnitude. That is, the computing equipment stores an upper threshold and a lower threshold of the pressure magnitude of the stylus touch input. Therefore, if the touch input has a pressure magnitude between the upper threshold and the lower threshold, the computing equipment determines that the touch input is the stylus touch input, and otherwise, determines that the touch input is the finger touch input.

If the touch input is the finger touch input, in step 307, the computing equipment expands the key input recognition region. That is, the computing equipment expands the key input recognition region of keys of which recognition regions need to be expanded. Thereafter, the procedure proceeds to step 309.

In contrast, if the touch input is the stylus touch input, in step 309, the computing equipment detects the key input. That is, if step 307 is followed by step 309, the computing equipment determines that a corresponding key is pressed when the input position is included in the expanded key input recognition region. In other words, the computing equipment detects the input key according to the expanded key input recognition region. Otherwise, if step 305 is followed by step 309, the computing equipment determines that a corresponding key is pressed when the input position is included in a non-expanded key input recognition region.

According to exemplary embodiments of the present invention, a key input recognition region is regulated based on a touch input type in computing equipment with a touch screen. Therefore, user convenience is ensured when a finger is used to provide a touch input.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for determining a key input in computing equipment having a touch screen that is configured to display a graphical user interface comprising at least one key, the method comprising:
   upon occurrence of a touch input on the touch screen, determining an input type of the touch input;
   defining a region over which an input is recognized for at least one key based on the determination of the input type of the touch input; and
   detecting the key input according to the defined region over which the input is recognized,
   wherein the region over which the input is recognized is defined so as to be associated with a corresponding key displayed on the graphical user interface and wherein the region over which the input is recognized varies based on the input type of the touch input, and
   wherein the key displayed on the graphical user interface which corresponds to the defined region over which the input is recognized does not vary based on the input type of the touch input.

2. The method of claim 1, further comprising:
   evaluating at least one of an input position, a pressure magnitude, and a press distribution of the touch input.

3. The method of claim 2, wherein the determining of the input type is performed by using at least one of the input position, the pressure magnitude, and the pressure distribution of the touch input.

4. The method of claim 3, wherein the determining of the input type comprises determining an input type according to an input type criterion depending on a preset pressure magnitude.

5. The method of claim 4, wherein the determining of the input type comprises:
   if the touch input has a pressure magnitude between an upper threshold and a lower threshold of the pressure magnitude of the stylus touch input, determining that the touch input is the stylus touch input; and
   if the touch input has a pressure magnitude greater than the upper threshold or less than the lower threshold, determining that the touch input is the finger touch input.

6. The method of claim 1, wherein the defining of the region over which the input is recognized comprises:
   expanding the region over which the input is recognized for the at least one key if the input type of the touch input is determined to be a finger touch.

7. The method of claim 6, wherein the expanding of the region over which the input is recognized comprises:
   defining the expanded region over which the input is recognized for the at least one key such that the region over which the input is recognized for the at least one key is greater than a corresponding display region of the at least one key.

8. An apparatus for determining a key input in computing equipment having a touch screen that is configured to display a graphical user interface comprising at least one key, the apparatus comprising:
- a determination unit for determining an input type of a touch input upon occurrence of the touch input on the touch screen; and
- a controller for defining a region over which an input is recognized for at least one key based on the determination of the input type of the touch input, and for detecting a key input according to the defined region over which the input is recognized,
- wherein the region over which the input is recognized is defined so as to be associated with a corresponding key displayed on the graphical user interface and wherein the region over which the input is recognized varies based on the input type of the touch input, and
- wherein the key displayed on the graphical user interface which corresponds to the defined region over which the input is recognized does not vary based on the input type of the touch input.

9. The apparatus of claim 8, wherein the touch screen evaluates at least one of an input position, a pressure magnitude, and a press distribution of the touch input.

10. The apparatus of claim 9, wherein the determination unit determines the input type by using at least one of the input position, the pressure magnitude, and the pressure distribution of the touch input.

11. The apparatus of claim 10, wherein the determination unit determines the input type according to an input type criterion depending on a preset pressure magnitude.

12. The apparatus of claim 11, wherein, if the touch input has a pressure magnitude between an upper threshold and a lower threshold of the pressure magnitude of the stylus touch input, the determination unit determines that the touch input is the stylus touch input, and if the touch input has a pressure magnitude greater than the upper threshold or less than the lower threshold, the determination unit determines that the touch input is the finger touch input.

13. The apparatus of claim 8, wherein the controller expands the region over which the input is recognized for the at least one key if the input type of the touch input is determined to be a finger touch.

14. The apparatus of claim 13, wherein the expanded region over which the input is recognized for the at least one key is defined so as to be greater than a corresponding display region of the at least one key.

15. A method for determining a key input in computing equipment having a touch screen that is configured to display a graphical user interface comprising at least one key, the method comprising:
- upon occurrence of a touch input on the touch screen, determining an input type of the touch input;
- defining a region where the input is recognizable for at least one key based on the determination of the input type of the touch input; and
- detecting the key input according to the defined region where the input is recognizable,
- wherein the region over which the input is recognized is defined so as to be associated with a corresponding key displayed on the graphical user interface and wherein the region over which the input is recognized varies based on the input type of the touch input, and
- wherein the key displayed on the graphical user interface which corresponds to the defined region over which the input is recognized does not vary based on the input type of the touch input.

* * * * *